Patented Feb. 4, 1930

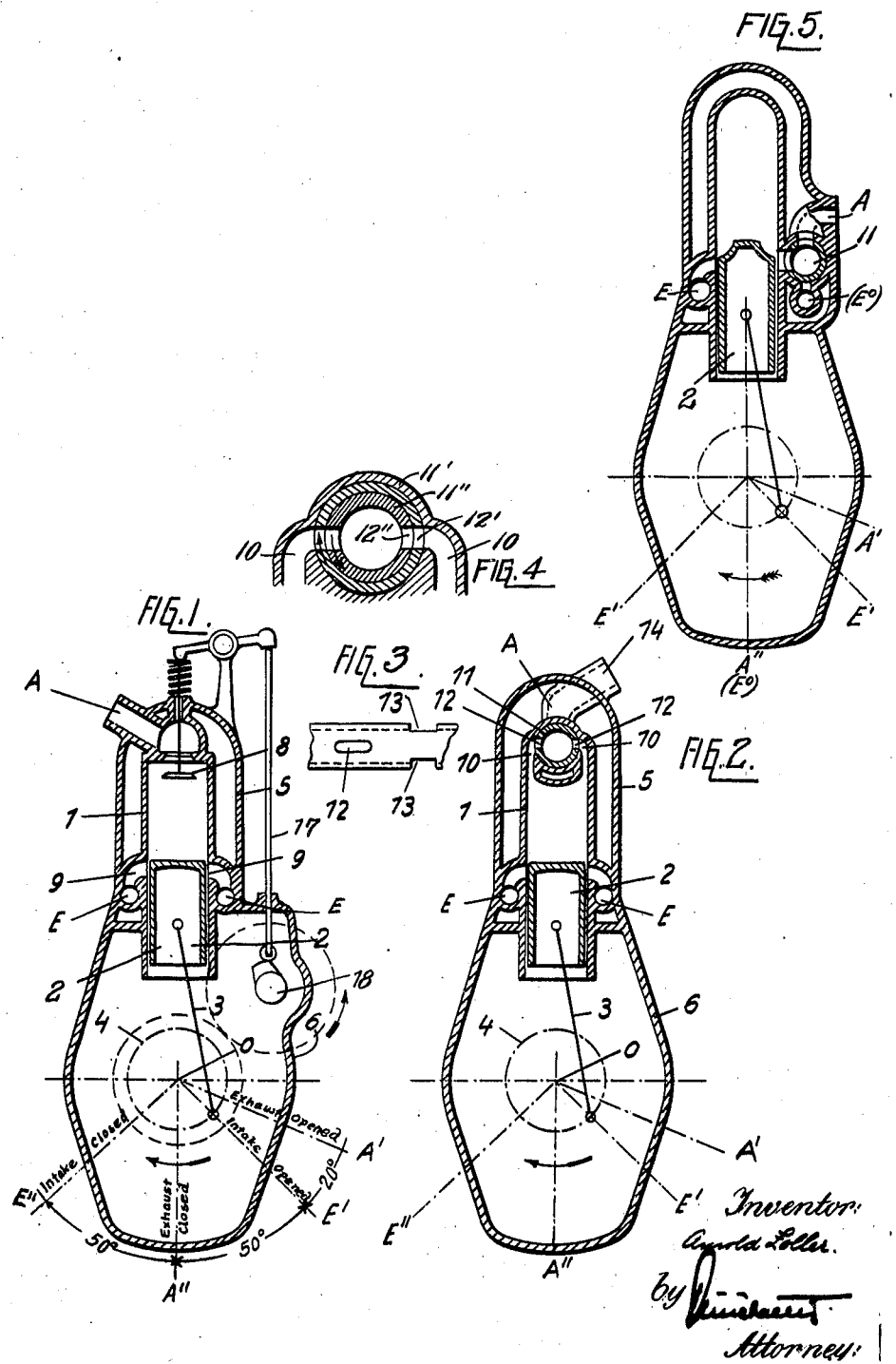

1,745,824

UNITED STATES PATENT OFFICE

ARNOLD ZOLLER, OF BERLIN, GERMANY

TWO-STROKE CYCLE ENGINE

Application filed February 6, 1923, Serial No. 617,418, and in Germany January 31, 1922.

My invention relates to internal combustion engines of the two-stroke type and it is an object of my invention to provide an engine of the kind described which may be supercharged without the necessity of introducing the supercharging mixture at high pressure. To this end I so time the operation of the means controlling the exhaust of the products of combustion and the intake of fresh combustible mixture that during the expansion stroke of the piston the exhaust controlling means, for instance, an exhaust valve of the usual type, are opened at a given crank angle in front of the lower dead centre that the intake ports are opened a little later to admit a charge of mixture which expels the exhaust gases and scavenges the cylinder, that the exhaust valve is closed at, or substantially at, the lower dead centre of the piston, finishing the scavenging period, and that the intake ports are closed on the compression stroke when the piston has moved through a given angle past its lower dead centre position. During this part of the stroke, more mixture is admitted for supercharging the engine. With this operation the products of combustion are released on the expansion stroke when the piston is at a given distance from the lower dead centre. Shortly afterwards the intake ports are opened, for instance, laid open by the piston, so that fresh mixture enters the cylinder and expels the exhaust gases. Before, however, the top stratum of fresh mixture has arrived at the exhaust port, the exhaust valve is closed while the intake ports remain open. In this manner sufficient time is available for effecting the required supercharging and a comparatively low pressure in the mixture suffices for introducing the mixture into the cylinder because the piston on its return stroke has only moved through a comparatively small angle when the intake ports are closed so that the compression pressure in front of the piston is insignificant and is overcome by a correspondingly low pressure of the inflowing mixture.

With two-stroke internal combustion engines in which valves are not provided but the intake and exhaust ports are both controlled by the piston it is necessary that the exhaust ports should be laid open before the intake ports are opened and therefore the exhaust ports must be considerably longer than the inlet ports. In practice the length of the exhaust ports is about one-fifth of the piston stroke so that the piston-swept volume of the cylinder is reduced correspondingly. It has been attempted to overcome this drawback by providing a separate intake valve so that the length of the exhaust ports is no longer a function of the length of the intake ports. In both cases, however, the control of the exhaust ports by the cylinder generates a comparatively high pressure in front of the piston as the fresh mixture can only be introduced after the piston has closed the exhaust ports on its compression stroke, whereas in my engine fresh mixture is admitted at a point considerably in advance of the lower dead centre and when practically atmospheric pressure obtains in the cylinder, and the intake period is finished about at the time when the mixture is injected in an engine of the usual type.

Fig. 1 is a transverse section of an engine having a normal poppet exhaust valve at the top of its cylinder, Fig. 2 is a transverse section of an engine having a rotary exhaust valve at the top of its cylinder, Fig. 3 is a detail of the rotary exhaust valve illustrated in Fig. 2, showing part of its barrel developed and on a larger scale, Fig. 4 is a transverse section of a modified rotary exhaust valve, also drawn to a larger scale, and Fig. 5 is a transverse section of an engine in which a rotary exhaust valve is arranged at the bottom instead of the top of the cylinder.

Referring to the drawings, 1 is the cylinder, 2 the piston, 3 the piston rod, 4 the crank circle with the centre O; 5 is the water jacket of the cylinder, and 6 the crank case. E is the intake passage for the charge, and A is the exhaust passage. A' is that crank position at which the exhaust ports are opened and A'' is that crank position at which the exhaust ports are closed. E' is that crank position at which the intake ports are opened, and E″ is that position at which the admission ports are closed.

The exhaust passage A is arranged in the cylinder head and the admission passage E is situated at the lower end of the cylinder. The exhaust is controlled by a mechanically operated valve 8, 18 is the cam shaft which is actuated by a toothed wheel gearing and acts on the rod 17 controlling the exhaust valve 8; the passage 9 which communicates with the intake ports E, is controlled by the piston 2. Scavenging air or charging air, or the fuel-air mixture and supercharging air, may be supplied through the port 9. The exhaust commences at the crank position O−A′. The exhaust valve closes at O−A‴, the admission at the crank-position O−A″. The charging may take place from said latter position to the closing of the admission channels by the piston, and the mixture supplied may have any desired pressure according to existing conditions. The directions of motion of the exhaust gases of the piston and of the charge are the same whereby scavenging losses by eddies, backing up, as well as losses in energy, are obviated and a good degree of admission is attained. Also if the ports 9 are elongated in order to increase the supercharged, nothing of the cylinder volume gets lost, for the mixture is further supplied until the piston has covered said ports 9.

A similar engine is illustrated in Figure 2, the difference being that the exhaust ports are controlled by a balanced rotary valve 11 devised for large sectional areas and high numbers of revolution. Said rotary valve 11 communicates with the combustion space through the channels 10, which terminate at two oppositely located points in such a manner that the pressures there exerted balance each other whereby a heavy load upon the rotary valve and quick wear and tear are obviated and the power required is diminished. The gases passing into the bore of the rotary valve 11 may either be conducted away into the atmosphere through that bore itself in axial direction, or may be led into the exhaust branch by means of ports 13 located laterally with respect to the head of the respective cylinder (Figure 5). With motors with a plurality of cylinders the exhaust ports 12 of one cylinder may form substitutes for the ports 13 of another cylinder, for instance, in the case of a six-cylinder motor where the number and distribution of said ports is such that always a sufficient number of exhaust-branches 14 coincide so that a sufficient sectional area for the exhaust is at disposal.

The importance of the rotary valve consists therein that in the case of a very high number of revolutions the manner of operation of spring-loaded and correspondingly large valves of the normal puppet type does no more appear sufficient as extraordinary spring pressures arise, so that the reliability is rendered questionable. Another solution may consist in using a larger number of small valves in the cylinder head instead of the rotary valve 11.

Instead of a single rotary valve 11 two coaxial valves 11′ and 11″ might be provided as shown in Fig. 5, and rotated in opposite directions by any suitable means. With this construction the ports 12′ and 12″ of the two valves are closed more rapidly and, besides, each concentric part rotates only at half the number of revolutions required for a single rotary valve. A constructional advantage of the concentric valves is that the ports are not controlled by the edges of the corresponding ports 10 in the cylinder casting but by the edges of the ports 12′ and 12″ themselves so that it is not necessary to machine the inside of the casting in which the two valves are rotatably arranged.

In the modification illustrated in Figure 4, the exhaust ports, as well as the intake ports, are arranged in the lower part of the cylinder. The exhaust ports are controlled by a rotary valve 11 which is similar to the valve 11 illustrated in Fig. 3 and may also be combined from two coaxial valves as shown in Fig. 5. The corresponding crank positions are again marked A′, E′, A″, E″.

The arrangement of the rotary valve may be such that the valve simultaneously controls the exhaust ports A and the intake ports E° (Figure 7). With this arrangement the uncovering of the intake ports commences at the crank position E° in the lower dead centre and the covering of the exhaust ports (A″) commences simultaneously therewith.

With all these arrangements the cam shaft 18 for the valves, or the driving shaft for the rotary valves, may be adjustable whereby it is rendered possible to increase or reduce the degree of admission, the degree of supercharging and the duration of the exhaust and intake periods, as desired. Devices of this kind are well known in the art to which this invention appertains and therefore are not illustrated.

I now revert to Figures 1 and 2 to treat more in detail the manner of operation of the improved two-stroke engine, and I assume that in the present instance it is intended to supercharge the cylinder with a volume of mixture which is equal to twice the cylinder volume.

In the position illustrated, the crank is at an angular distance of about 50 degrees from its lower dead centre radius O A″ and the piston is about to open the intake ports 9. This position is indicated by the radius O E′. The exhaust valve 8 has been opened at a crank angle of about 70 degrees from the radius O A″ as indicated by the radius O A′, that is, the opening of the exhaust valve 8 leads the opening of the intake ports 9 for about 20 degrees. When the exhaust valve 8 opens the pressure in the cylinder is very soon reduced to atmospheric. When the piston continues its downward stroke the intake ports 9 are completely opened and the mixture enters the cylinder, flowing toward the exhaust port A and expelling the exhaust gases. In order to prevent loss of mixture, the exhaust valve 8 should be closed before any mixture is able to attain the exhaust port A. When the exhaust valve 8 has been closed which is generally effected at or about the dead centre position O A'', the scavenging period is finished. The piston now starts for its compression stroke and gradually reduces the free area of the intake ports 9 which it finally closes in the position of the radius O E'', that is, at a crank angle of about 50 degrees to the left of the lower dead centre position O A''. In this manner the scavenging and supercharging of the cylinder is effected without any loss in the cylinder. This scavenging and supercharging period which, with a high-speed engine, extends over about 50 degrees, according to the number of revolutions and the size of the engine, requires therefore the closing of the exhaust at or about at the lower dead centre. The closing of the exhaust ports depends also upon the desired supercharge and the pressure of the mixture. After the exhaust has been closed at the lower dead centre, the intake ports 9 remain open for a given period which is determined by the degree of supercharging desired. If, as in the present instance, the degree of supercharging is 100 per cent and the engine is in an air-plane at an altitude of about 15,000 feet the angle which the radius O E'' includes with the O A'' of the dead centre position should be about 50 degrees as shown in Fig. 1. With the large areas laid open for the inflowing mixture there is ample time for attaining the desired degree of supercharging even at maximum number of revolutions and at the same time, the power input to the supercharging compressor is a minimum on account of the low pressure obtaining in the cylinder. In the example illustrated the scavenging period and the supercharging period both correspond to a crank angle of 50 degrees. It will be understood that obviously these angles are only given by way of example and may be varied as required by given conditions.

At a super-admission of 200% of the stroke volume the exhaust is closed about 15 degrees before the lower dead centre, so that about 65 degrees, that is double the time, required for scavenging and charging, remain for the secondary supply.

I wish it to be understood that I do not desire to be limited to the exact details of construction, as obvious modifications will readily occur to a person skilled in the art.

I claim:—

A two-stroke cycle engine comprising a cylinder, a single acting piston movable in said cylinder, an intake port and an exhaust port in said cylinder, means for controlling said intake port, and separate means independent of said piston for controlling said exhaust port, said separate means comprising a valve with an axial bore, lateral ports 13 acting as a second exhaust passage around the circumference of said valve, a port 12 connecting with the axial bore of said valve, said port also communicating with the combustion chamber of the cylinder, and to close said exhaust port near the lower dead centre position of said piston and before said intake port is closed.

In testimony whereof I affix my signature.

ARNOLD ZOLLER.